United States Patent Office 2,720,489
Patented Oct. 11, 1955

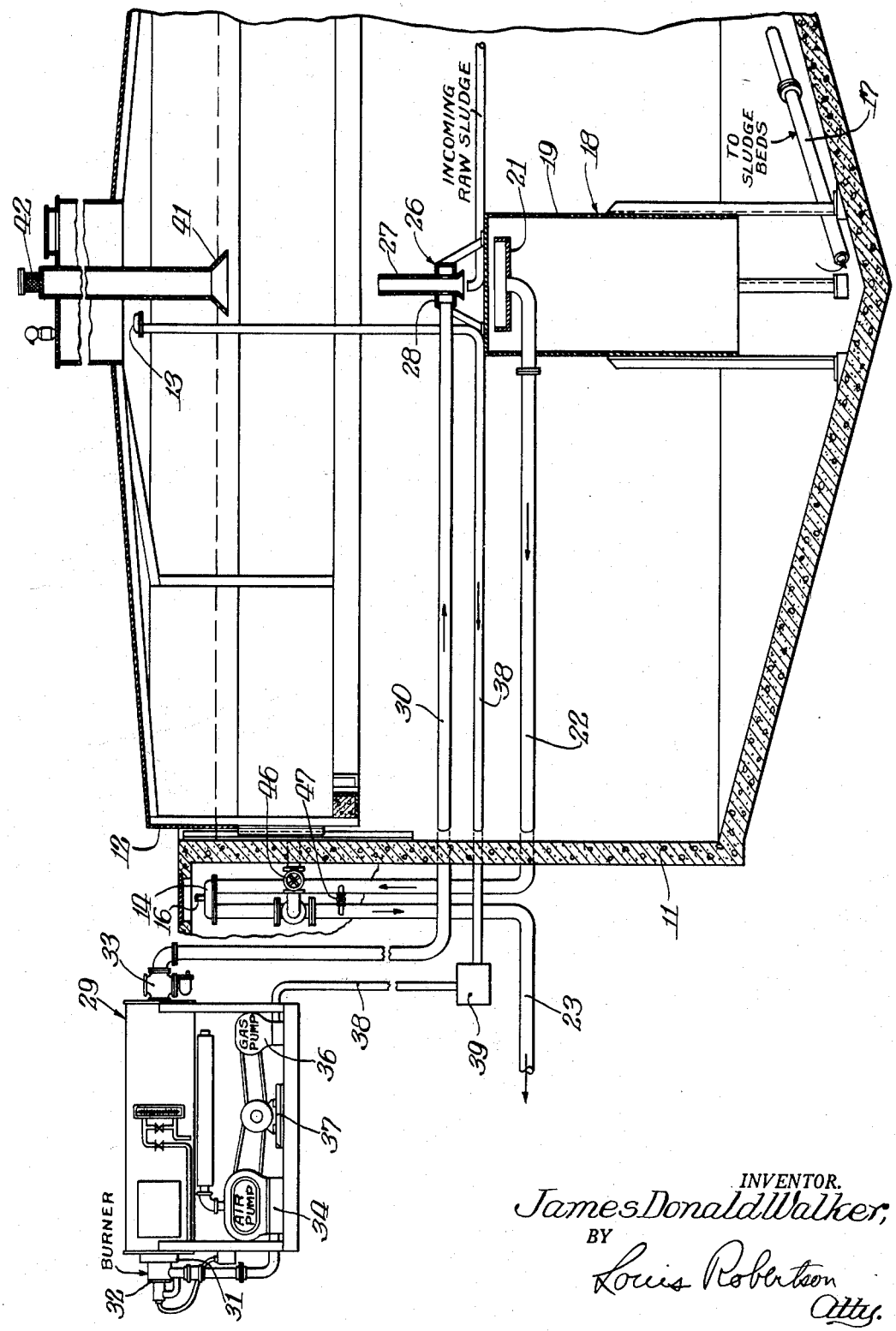

2,720,489

DIGESTER

James Donald Walker, Aurora, Ill., assignor to Walker Process Equipment Inc., Aurora, Ill., a corporation of Illinois Application November 22, 1950, Serial No. 197,047

7 Claims. (Cl. 210—2)

In the digestion of sludge from sewage treatment units and the like, it has long been customary to carry the sludge to a digester, a large tank in which it is held for relatively long periods of time. In these digester tanks, the solids are digested or stabilized in the course of time by anaerobic bacteria. The digesting process is accelerated by maintaining an optimum temperature. This requires the application of considerable heat during cold weather.

Until recently, the most common method of heating digesters involved the use of coils for circulating hot water through the tank, usually just inside the walls thereof. This involved a relatively expensive installation and could cause considerable trouble if not properly regulated at all times. Excessive temperatures could cause encrustation on the pipes, reducing their efficiency. Cleaning off such encrustations was extremely obnoxious and even dangerous.

According to another form of heating, sludge from the digester contents was drawn off, passed through a heat exchanger where such contents were raised to the desired temperature, and then returned to the tank. The higher speed of movement of the slurry through the heat exchanger pipes reduced the likelihood of encrustation, thereby permitting more tolerance in the controls. Furthermore, the heat exchangers could be designed to facilitate cleaning of the encrustation, should it occur, the flow of obnoxious gases meanwhile being cut off so that there was no danger or annoyance from them.

It has long been recognized that there were some desirable aspects in having a constant movement or circulation within the digester tank. It has been thought that the circulation of slurry from the digester and back would be advantageous in this regard. It has also been thought that convection currents from the heating coils within the digester might produce beneficial results. Neither method of circulation has proved very satisfactory. Not only have they failed to produce the most desirable movements within the tank but they have also made more difficult the withdrawal of clear effluent. It should be understood that to carry the sludge or other solids into the tank, much more water was required than could remain within the tank. It has been the practice to have draw-off pipes at several levels and to try to select a level at which relatively clear liquid could be drawn off. With circulation, it has been difficult to find such a level. In any event, changing conditions are likely to keep any level from being dependable.

According to the present invention, the effluent is drawn off through a clarifier which ensures a relatively clear effluent. Considered alone, this is the subject of co-pending application Serial No. 103,235, filed July 6, 1949, abandoned after this application was filed. This clarification of effluent makes tolerable a much more pronounced circulation within the tank than might otherwise be considered acceptable. This new tolerance is made use of by heating the contents of the tank by direct injection of hot gases in a way causing effective circulation. For thermal efficiency, the hot gases must be liberated well below the surface of the liquid so that most of their heat will be given off to the liquid. This produces a very pronounced circulation throughout the upper portion of the digester tank, the upwardly moving gases acting on the airlift principle to raise large bodies of the liquor in that vicinity. This heated and gasified liquor tends to stay on top of the colder liquor in the tank and hence it spreads out to the far walls of the tank, displacing colder liquor and by its momentum helps set up a broad annular roll. On this is superimposed a downward drift of the cooler liquid and of the solids.

This liberation of heat by direct injection of hot gases may be accomplished very efficiently. Digesters produce a burnable gas. This gas may be drawn off, pumped to a pressure slightly in excess of the hydrostatic pressure at the point of ultimate liberation, burned with air pumped to a like pressure, and passed to the gas liberator. The products of this combustion, if conditions are efficient, will be largely $CO_2$. To avoid excessive dilution of the combustible gases with such spent products of combustion, they are drawn off separately by means of a small hood over the area of liberation. Being substantially free from the obnoxious unburned gases formed in the digester, these products of combustion may pass to the atmosphere from the hood.

Additional objects and advantages of the invention will be apparent from the description and the drawing, in which the one figure is a fragmentary and diagrammatic representation of the form of this invention chosen for illustration, the digester being shown in vertical cross-section.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

*General description*

The invention has been illustrated in connection with digester 11, which may be conventional except as here described. Digesters are commonly provided with gas storage covers 12, which are vertically movable. Gas formed within the digester is trapped within such covers and may be drawn off by a gas drawoff fitting 13 positioned above the water level. The water level in the digester is maintained approximately constant by an overflow device 14 vented to the atmosphere through a pipe 16. The digested or stabilized sludge settles to the bottom of the tank, from which point it is drawn off by a draw-off pipe 17.

According to the present invention and according to the co-pending application above mentioned, the overflow device 14 draws its water from a clarifier 18. This clarifier comprises a skirt 19 into which liquid can flow from the tank only through the bottom of the skirt. According to the illustrated form of the invention, skirt 19 is closed at its top, thus forming a hood. It could, however, extend upwardly and be open to the gas in cover 12. The closed hood is preferred at the present time for reasons of economy and to make room for the apparatus located thereabove and described hereafter. Located within the skirt 19 and near the top thereof is a smooth-flow draw-off device 21. This is designed to draw approximately equally from widely-spaced points so as not to cause agitation or channeling within the skirt 19.

Although both solids and water will enter skirt 19 at the bottom thereof, the rate of upward flow within the skirt 19 is slow enough so that the solids have time to settle and reasonably clear water is drawn through the draw-off device 21, through connecting pipe 22 to overflow device 14 and through effluent discharge pipe 23 to any desired point of disposal. A high degree of clarity for this effluent is not required, especially if the common practice is followed of returning it to the sewage-treating unit so that it passes through the final settling tank. The clarifier 19 therefore need not be exceptionally large so as to provide a relatively slow rate of upward flow therethrough. A rate of flow of not over two gallons per minute per square foot has been found to give satisfactory results.

The skirt 19 preferably extends to a low enough level in the tank so that it is below the level of the circulating roll and below the level at which most of the gas formation takes place. Hence there is no need to protect it from rising gases. This low level also facilites its clarifying function, because only the relatively dense settled solids which are stabilized and hence usually free from clinging gas enter the skirt 19.

Positioned at a level substantially lower than the skirt 19 and hence conveniently positioned on top of the clarifier 18 is a gas-liberating device 26. If it did nothing else, this gas liberator device would be useful in causing a desirable circulation within the digester as described. To this end it may conveniently comprise a vertical tube 27, into which gas is liberated through perforations by a jacket 28. Tube 27 thus functions as an airlift pump to draw the digester liquor, including solids, into its open bottom and discharge them at its open top, the airlift action continuing thereabove.

According to the preferred form of the present invention, this gas which produces the circulation also heats the digester contents. Thus the jacket 28 is supplied with hot gases from a hot gas producer 29 which is connected to jacket 28 through pipe 30.

The hot gas producer 29 may be of a known type, including a sealed combustion chamber 31 fitted with burner 32 and at the other end with pipe 30, or a fitting 33 which may be used for various purposes such as an excess pressure relief valve, a drip trap, and conceivably spraying the hot gases with water if preliminary partial cooling of the gases is necessary. The combustion chamber 31 is cooled by a water jacket to preserve its life. The burner 32 is supplied with air under pressure by an air pump 34 and with gas under pressure by gas pump 36, both being driven by a motor 37. The air pump 34 may draw the air from the atmosphere, preferably through a heat exchanger to heat the air by waste heat for better efficiency. The gas pump 36 preferably draws gas from draw-off fitting 13 through pipes 38 and convenient safety and gas-drying unit 39.

The hot gas producer 29 may be located at any convenient point, such as in a nearby building. It is preferably above the level of the water in the digester 11.

The hot products of combustion are thus liberated into the tube 27. Inasmuch as these gases are liberated through perforations and pass upwardly as moderately small bubbles, the heat transfer between them and the liquid is quite efficient and they give off most of their usable heat before they reach the surface, thus warming the contents of the digester.

A hood 41 is desirable and is positioned with its lower edge below the water level so that it is sealed from the liquid by the gas passing within the cover 12. This hood 41 is centered over the tube 27 so that the great majority of the gases which are liberated through the tube 27 are caught by the hood 41. The hood 41 may communicate with a vent 42 so that these spent gases may pass to the atmosphere. The hood 41, including the tube extending upwardly, should be large enough in diameter so that liquid will not be carried up in it excessively by airlift action.

An emergency overflow or draw-off valve 46 is preferably provided, connected as shown, and also a bleed-off valve 47. Opening the latter may be helpful if occasional charges of raw sludge are supplied to the tank in quantities which would cause excessive flow through clarifier 18. The bleed valve will lower the level between the times of charging so that excessive hydrostatic pressure will not be produced by such charges. Both of valves 46 and 47 should be high enough not to carry the liquor level below the level required to seal the cover 12 in the latter's lowest position.

The diameter of the casing or skirt 19 could be such that during pumping of sludge into the tank a maximum rate of rise suitable for settling the readily settleable solids will not be exceeded. In most instances a rate of rise of 2 U. S. gallons per minute per square foot is sufficiently slow. The casing or skirt 19 need not be this large, however. Between pumpings, which usually do not last more than five minutes, the contents of casing 19 have a long quiescent period. Hence it is only necessary that the capacity of the casing below the draw-off be equal to the volume of sludge pumped in five or ten minutes, the latter giving a margin of safety. It may be assumed that sludge will only be pumped from one hopper, or "class" of hoppers (a group connected for simultaneous pumping) at a time.

The disclosure of application Serial No. 103,235 is incorporated herein by reference.

I claim:

1. A digester for solids gathered in waste treatment plants including a tank having an upper zone of substantially unrestricted circulation and in which gas formation occurs, an outflow conduit having means for maintaining the liquid in the tank at a given level, a partition within the tank forming an isolated clarifier chamber constantly communicating with the tank only at a depth below the level of substantial gas formation to receive solids and liquid from the tank and to allow the solids to settle back into the tank at any time, and a slow flow draw-off intake in the clarifier chamber below the liquid level but substantially above the level of communication between the chamber and the tank for withdrawing clarified liquor from the chamber, said intake communicating with said conduit.

2. A digester for solids gathered in waste treatment plants including a tank having an upper zone of substantially unrestricted circulation and in which gas formation occurs, an outflow conduit having means for maintaining the liquid in the tank at a given level, a partition within the tank forming an isolated clarifier chamber constantly communicating with the tank only at a depth below the level of substantial gas formation to receive solids and liquid from the tank and to allow the solids to settle back into the tank, and a slow flow draw-off intake in the clarifier chamber below the liquid level but substantially above the level of communication between the chamber and the tank for withdrawing clarified liquor from the chamber, said intake communicating with said conduit, said partition comprising a tube open at its bottom.

3. A digester for solids gathered in waste treatment plants including a tank having an upper zone of substantially unrestricted circulation and in which gas formation occurs, an outflow conduit having means for maintaining the liquid in the tank at a given level, a partition within the tank forming an isolated clarifier chamber constantly communicating with the tank only at a depth below the level of substantial gas formation to receive solids and liquid from the tank and to allow the solids to settle back into the tank at any time, and a slow flow draw-off intake in the clarifier chamber below the liquid level but substantially above the level of communication between the chamber and the tank for withdrawing clarified liquor from the chamber, said intake communicating with said conduit, the diameter of said clarifier chamber being sufficient to provide a maximum rate of rise therein of not over two gallons per minute per square foot.

4. A digester for solids gathered in waste treatment plants including a tank having an upper zone of substantially unrestricted circulation and in which gas formation occurs, raw sludge inflow means discharging into said tank, a partition within the tank forming a clarifier chamber and having a large opening communicating constantly with the tank only at a depth below the level of substantial gas formation to receive solids and liquid from the tank and to allow the solids to settle back into the tank at any time, said inflow means communicating with the tank only outside of the partition; and means for drawing off liquor from only within the clarifier chamber, including means for maintaining the liquid in the tank at a given level, and a draw-off intake in the upper third of the clarifier chamber below the liquid level but substantially above the level of communication between the chamber and the tank for withdrawing clarified liquor from the chamber.

5. A digester according to the preceding claim, having means for causing circulation of the sludge at levels above the level of the communication between the chamber and the tank.

6. The method of withdrawing supernatant liquor from a digester having an upper zone of substantially unrestricted circulation and in which gas formation occurs which comprises flowing liquid and solids from only below the level of substantial gas formation into the lower part of a clarifier having no other supply and no other communication with the liquid content of the tank, passing the liquid up through the clarifier with a rate of rise not over two gallons per minute per square foot, allowing the solids to settle back into the digester at any time and withdrawing clarified supernatant liquor from an upper level of the clarifier.

7. The method of withdrawing supernatant liquor from a digester having an upper zone of substantially unrestricted circulation and in which gas formation occurs which comprises flowing liquid and solids from only a lower well-digested sludge zone into only the lower part of a clarifier having no other supply and no other communication with the liquid content of the tank, passing the liquid up through the clarifier, retaining it in the clarifier long enough to permit the readily settleable solids to settle therefrom, and withdrawing clarified supernatant liquor from an upper level of the clarifier.

References Cited in the file of this patent

UNITED STATES PATENTS

| | | |
|---|---|---|
| 1,820,976 | Imhoff | Sept. 1, 1931 |
| 1,987,888 | Babbitt et al. | Jan. 15, 1935 |
| 2,188,847 | Streander | Jan. 20, 1940 |
| 2,263,451 | Bach | Nov. 18, 1941 |
| 2,336,659 | Welp | Dec. 14, 1943 |
| 2,373,154 | Welp | Apr. 10, 1945 |
| 2,409,585 | Pratt | Oct. 15, 1946 |
| 2,538,412 | Cecil et al. | Jan. 16, 1951 |
| 2,638,444 | Kappe | May 12, 1953 |

FOREIGN PATENTS

| | | |
|---|---|---|
| 441,851 | Germany | Mar. 16, 1927 |